(12) United States Patent
Mudric (10) Patent No.: US 11,265,248 B2
(45) Date of Patent: Mar. 1, 2022

(54) SYSTEM LOG MESSAGES HOSTNAME ADDRESS SELECTION BY MULTIHOMED HOSTS

(71) Applicant: Avaya Inc., Santa Clara, CA (US)

(72) Inventor: Dusan Mudric, Ottawa (CA)

(73) Assignee: Avaya Inc., Santa Clara, CA (US)

( * ) Notice: Subject to any disclaimer, the term of this patent is extended or adjusted under 35 U.S.C. 154(b) by 22 days.

(21) Appl. No.: 16/656,366

(22) Filed: Oct. 17, 2019

(65) Prior Publication Data

US 2021/0119916 A1 Apr. 22, 2021

(51) Int. Cl.
*H04L 12/749* (2013.01)
*H04L 12/741* (2013.01)
*H04L 12/707* (2013.01)
*H04L 45/741* (2022.01)
*H04L 45/00* (2022.01)
*H04L 45/745* (2022.01)

(52) U.S. Cl.
CPC ............ *H04L 45/741* (2013.01); *H04L 45/22* (2013.01); *H04L 45/745* (2013.01)

(58) Field of Classification Search
CPC ..... H04L 45/741; H04L 45/22; H04L 45/745; H04L 45/26; H04L 61/6077; H04L 61/2007
USPC ......................................................... 370/392
See application file for complete search history.

(56) References Cited

U.S. PATENT DOCUMENTS

| | | | | |
|---|---|---|---|---|
| 9,735,983 B1* | 8/2017 | Sharma | ............... | H04L 12/4675 |
| 2004/0111529 A1* | 6/2004 | Parmar | .................. | H04L 47/10 |
| | | | | 709/245 |
| 2005/0083844 A1* | 4/2005 | Zhu | ......................... | H04L 45/04 |
| | | | | 370/230.1 |
| 2006/0050628 A1* | 3/2006 | Ng | ....................... | H04W 60/005 |
| | | | | 370/216 |
| 2006/0126613 A1* | 6/2006 | Zweig | ................. | H04L 12/5692 |
| | | | | 370/389 |
| 2007/0030855 A1* | 2/2007 | Ribiere | ............... | H04L 12/5692 |
| | | | | 370/401 |
| 2007/0156874 A1* | 7/2007 | Magro | .............. | H04L 29/12952 |
| | | | | 709/223 |
| 2007/0250642 A1* | 10/2007 | Thubert | ............ | H04L 29/12915 |
| | | | | 709/245 |
| 2012/0314624 A1* | 12/2012 | Asati | ................... | H04L 41/0883 |
| | | | | 370/257 |
| 2016/0191374 A1* | 6/2016 | Singh | ...................... | H04L 45/22 |
| | | | | 370/228 |

OTHER PUBLICATIONS

"Syslog Tutorial: How It Works, Examples, Best Practices, and More," Stackify, Jun. 30, 2017, 23 pages [retrieved online from: stackify.com/syslog-101/].
Gerhards "The Syslog Protocol," IETF Trust, Mar. 2009, RFC 5424, 38 pages.

* cited by examiner

*Primary Examiner* — Candal Elpenord
(74) *Attorney, Agent, or Firm* — Sheridan Ross P.C.

(57) ABSTRACT

A method, system, device, or apparatus for selecting an IP address for a message. The method, system, device, or apparatus is used when there are two or more IP addresses for a multihomed device. The method determines an IP address reachable from a destination for the message. The message is generated using the reachable IP address as the hostname of the multihomed device. The generated message is transferred to the destination.

19 Claims, 10 Drawing Sheets

Host 110A IP Address List 230A

| PREFIX | IP ADDRESS | ISP | INGRESS FILTERING |
|---|---|---|---|
| 2000::/64 | 2000::201 | 1 | YES |
| Fc00::/64 | Fc00::301 | 2 | NO |

Host 110B IP Address List 230B

| PREFIX | IP ADDRESS | ISP | INGRESS FILTERING |
|---|---|---|---|
| Fc00::/64 | Fc00::302 | 2 | NO |

| Host 310 IP Address List 430 ||||
| ROUTER | PREFIX | IP ADDRESS | ISP | LINK FAILURE |
|---|---|---|---|---|
| 320 | 2000::/64 | 2000::201 | 1 | YES |
| 330 | 3000::/64 | 3000::301 | 2 | NO |

SYSTEM LOG MESSAGES HOSTNAME ADDRESS SELECTION BY MULTIHOMED HOSTS

FIELD OF THE DISCLOSURE

The present disclosure is generally directed toward communications and more particularly toward selecting a HOSTNAME Internet Protocol (IP) address for system log messages based on the address of a system log server or a policy-based address selection.

BACKGROUND

Communication devices are used for voice and video calling, video conferencing, gaming, Internet access, media streaming, data messaging, email, machine-to-machine data transfers, computerized information services, and the like. Communication devices exchange data with communication systems to provide these various data services. The communication devices may be phones, smartphones, computers, laptops, tablets, wearable devices, media players, intelligent machines, and the like. Devices may communicate with other devices on the same network, and/or may communicate with devices on other networks. When devices want to communicate with devices on other networks, the communications may be transferred through a gateway, which is normally a default gateway. Communication systems may include Internet Protocol (IP) networks to transfer data.

Routers perform data traffic directing functions, such as transferring data packets between networks. Data packets are sent from one router to the next, until the packets reach the destination node. A source address indicates the IP address for the sending node, and the destination address indicates the IP address for the receiving node. In many communications, data packets flow bidirectionally. Routers advertise their information, such as prefix information, using Router Advertisement messages. The prefix information indicates the addresses that are reachable through the router. The Router Advertisement messages may also include next-hop information, for the next router in the packet route. Each router generates and maintains a routing table that lists preferred packet routes.

Multihomed devices may have multiple addresses (e.g., IPv4 and IPv6 addresses and/or multiple IPv6 addresses). A host routinely transmits system log messages to a system log server. In the event of an error or failure the host will send an error or failure message to the system log server. The system log messages include the IP address for the host or the HOSTNAME that identifies the host sending the message. The HOSTNAME should contain the hostname and the domain name of the message originator in the format specified in STD 13. This format is called a Fully Qualified Domain Name (FQDN). Not all systems/applications provide a FQDN, as such other methods may be used to determine the HOSTNAME of a device. System Logs may be used for activities such as troubleshooting or rolling back the system after a failure incident. The system log server will use the HOSTNAME in the system log message to connect with the host.

SUMMARY

Embodiments of the present disclosure seek to enhance connectivity to a system log server by multihomed devices. Multihomed devices may have multiple addresses, however, the system log server may only be connected to some of the paths reachable from a device. Therefore, if the system log message contains an address unreachable from the system log server, an administrator of the system log server would be unable to reach the device. Therefore, it would be helpful to ensure that the device selects an address reachable from the system log server for the system log messages. When a device tries to connect to an endpoint using multiple addresses or paths, the device may randomly select an address for the message. In some examples, devices with multiple addresses are connected to multiple Internet Service Providers (ISPs).

An enterprise may use multiple ISPs for various reasons, such as security reasons, disaster recovery, cost. ensuring connectivity for critical applications (e.g., use a more secure/reliable ISP for critical applications and a less reliable/expensive ISP for non-critical applications), and load balancing. In this situation, an enterprise device may have multiple addresses, the device may be assigned multiple addresses from multiple ISPs. In addition, each ISP may have their own prefix for IP addresses. If an ISP goes down, the associated link(s) will fail. Therefore, if the host selects an IP address associated with the failed ISP, the system log server will also not be able to reach the host.

Embodiments of the present disclosure propose the ability to ensure that the device selects an address reachable from the system log server for the HOSTNAME. The HOSTNAME identifies the message originator, if a FQDN is provided, this FQDN should be used as the HOSTNAME. However, not all applications provide a FQDN, therefore, the HOSTANME may include other content. In order of preference after FQDN, the contents of the HOSTNAME include: a static IP address, hostname (e.g., MAC address), a dynamic IP address, or a NILVALUE. For static and dynamic IP addresses an address reachable from the destination should be selected. Continuing the example above, the device should be forced to select 2000::201 for the HOSTNAME in the alarm message to the system log server. Advantageously, the present disclosure will ensure an administrator/operator of the system log server is able to reach a multihomed device within an enterprise, even when the enterprise utilizes multiple prefixes (e.g., ISPs).

It is, therefore, one aspect of the present disclosure to provide a method of ensuring the device selects an address reachable from the destination for the HOSTNAME. The IP address selection algorithm of the present disclosure may be used when selecting a static and/or dynamic IP address.

Although in the examples illustrated herein IPv6 addresses are used, it should be understood that same method may be applied to any device that uses IP addresses to communicate, and single network or multihomed devices.

When a multihomed host sends its HOSTNAME/IP address in a system log message, if the address reported in the HOSTNAME part of the system log message header is wrong, a host might not be reachable for troubleshooting from the system log server location. For example, if the wrong HOSTNAME/IP address is selected for the system log message, an administrator monitoring the system log server logs may not be able to reach the host using the selected addressed. As a consequence, emergency message or alarms may contain a host address that is not reachable from the system log server location. Therefore, the administrator/operator of the system log server may not be able to troubleshoot or roll back the multihomed host after receiving the wrong address in the log message. In addition, for IPv6 addresses, where the prefixes are assigned to a specific ISP, the wrong addressed may identify the wrong ISP used to transfer system log message(s).

In this model a device, such as a host, may select an address reachable from the system log server for the HOSTNAME when sending a system log report to the system log server, which ensures that an administrator/operator is able to reach the host.

In some embodiments, a method is provided that generally comprises:

A method for a multihomed host to select a hostname for a message, the method comprising:

determine two or more Internet Protocol (IP) addresses for the multihomed host;

determine an IP address that is reachable from a destination;

generate the message using the reachable IP address for the hostname of the multihomed host; and transfer the message to the destination.

In another embodiment, a multihomed device to select a hostname for a message, the multihomed device comprising:

a transceiver configured to multicast a solicitation message, and in response, to receive two or more address prefixes in an advertisement message;

a processor configured to dynamically assign two or more IP addresses using the two or more address prefixes;

the processor configured to determine an Internet Protocol (IP) address reachable from a destination for the message;

the processor configured to generate the message using the reachable IP address as the hostname of the multihomed device;

the transceiver configured to transfer the message to the destination.

A computer-readable medium storing one or more programs, the one or more programs comprising instructions, which when executed by an electronic device cause the electronic device to implement a method for a multihomed host to select a hostname for a message, comprising:

determining two or more Internet Protocol (IP) addresses for the multihomed host;

determining an IP address that is reachable from a destination;

generating the message using the reachable IP address for the hostname of the multihomed host; and transferring the message to the destination.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be a graph database as described herein. Accordingly, the disclosure is considered to include a tangible storage medium and prior art-recognized equivalents and successor media, in which the software implementations of the present disclosure are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

It should be appreciated that embodiments of the present disclosure can be utilized in numerous address selection scenarios.

Furthermore, while the illustrative embodiments herein show the various components of a system collocated, it is to be appreciated that the various components of the system can be located at distant portions of a distributed network, such as a communication network and/or the Internet, or within a dedicated secure, unsecured, and/or encrypted system. Thus, it should be appreciated that the components of the system can be combined into one or more devices, such as an enterprise server or collocated on a particular node of a distributed network, such as an analog and/or digital communication network. As will be appreciated from the following description, and for reasons of computational efficiency, the components of the system can be arranged at any location within a distributed network without affecting the operation of the system. For example, the various components can be located in a device, a local server, at one or more users' premises, or some combination thereof.

Figure 1A:
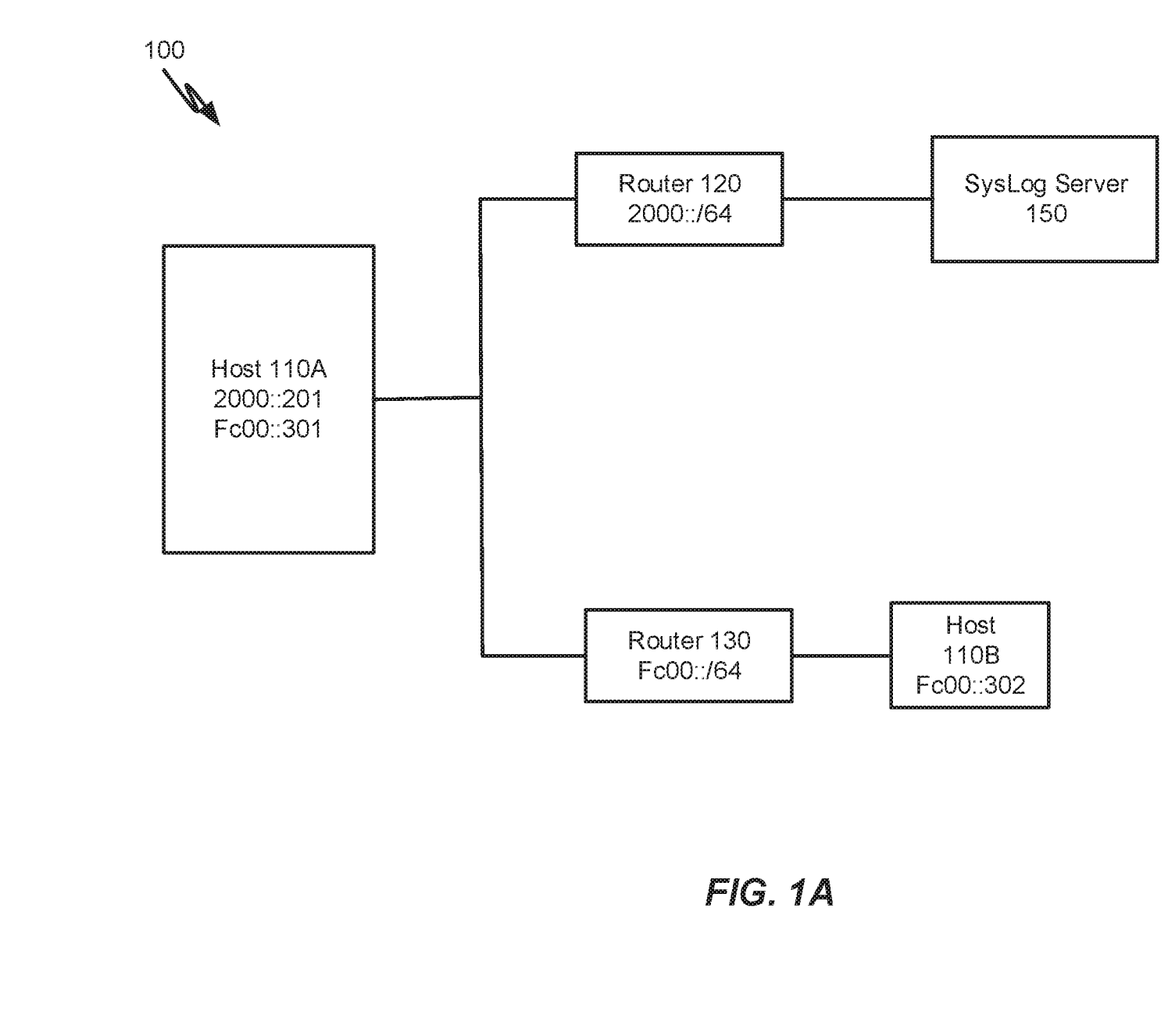
FIG. 1A is a block diagram depicting a communication system in accordance with embodiments of the present disclosure.

FIG. 1A illustrates an enterprise network 100 comprising hosts 110A and 110B, routers 120 and 130, and system log server 150. The host 110A is a multihomed device, and may use IP address 2000::201 (via router the 120) or IP address Fc00::301 (via router 130). The host 110B is only connected to the router 130 and has one IP address Fc00::302. In some embodiments, each of the router 120 and 130 are associated with a different ISP (e.g., ISP 1 and ISP 2). Router 130 is on a local network and not accessible globally. A subnetwork or subnet may correspond to a logical subdivision of an IP network. The practice of dividing a network into two or more networks is called subnetting. Devices that belong to the same subnet are addressed with an identical most-significant bit-group in their IP addresses. This results in the logical division of an IP address into two fields, the network number or routing prefix and the rest field or host identifier. The rest field is an identifier for a specific host or network interface. Traffic is exchanged between subnetworks through routers when the routing prefixes of the source address and the destination address differ. For example, when the host 110A uses address Fc00::301, it is on the same subnet as the host 110B using address Fc00::302.

FIG. 1A illustrates the hosts 110A and 110B, the routers 120 and 130, and the system log server 150 connected in the enterprise network 100. In some examples, the enterprise network 100 may represent a public network such as the Internet. As illustrated, the host 110A is connected to the routers 120 and 130, the host 110B is connected to the router 130, and the system log server 150 is connected to the router 120. For example, router 120 may be connected to ISP 1, and system log server 150 is also reachable from ISP 1. It should be appreciated that host 110A and system log server 150 may not be directly connected to router 120.

Figure 1B:
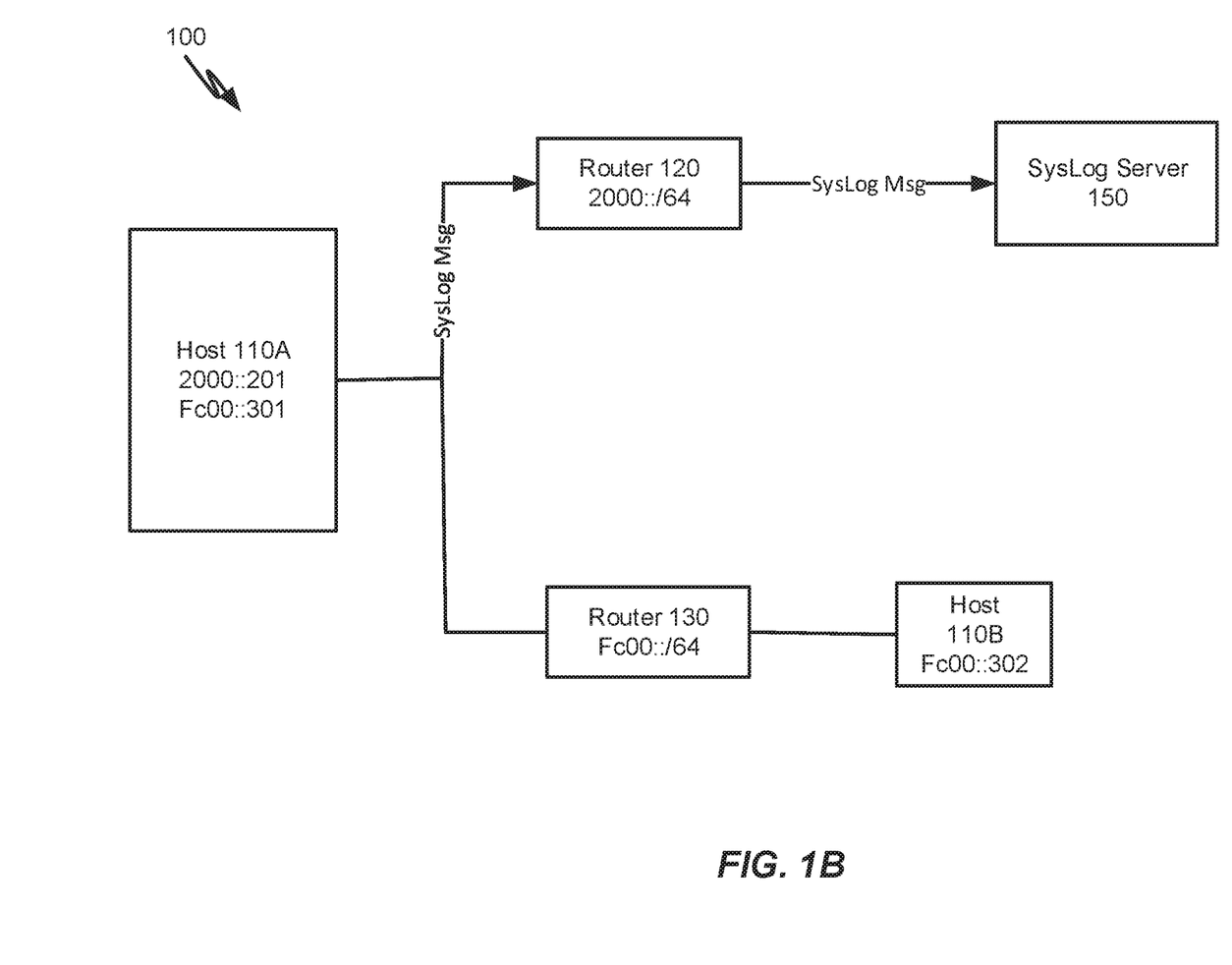
FIG. 1B is a block diagram depicting a communication system in accordance with embodiments of the present disclosure.

FIG. 1B illustrates the host 110A transferring a system log message to the system log server 150 via the router 120. Although the log message is being sent via the router 120, the host 110A may select either address 2000::201 or address Fc00::301 as the HOSTNAME.

Figure 1C:
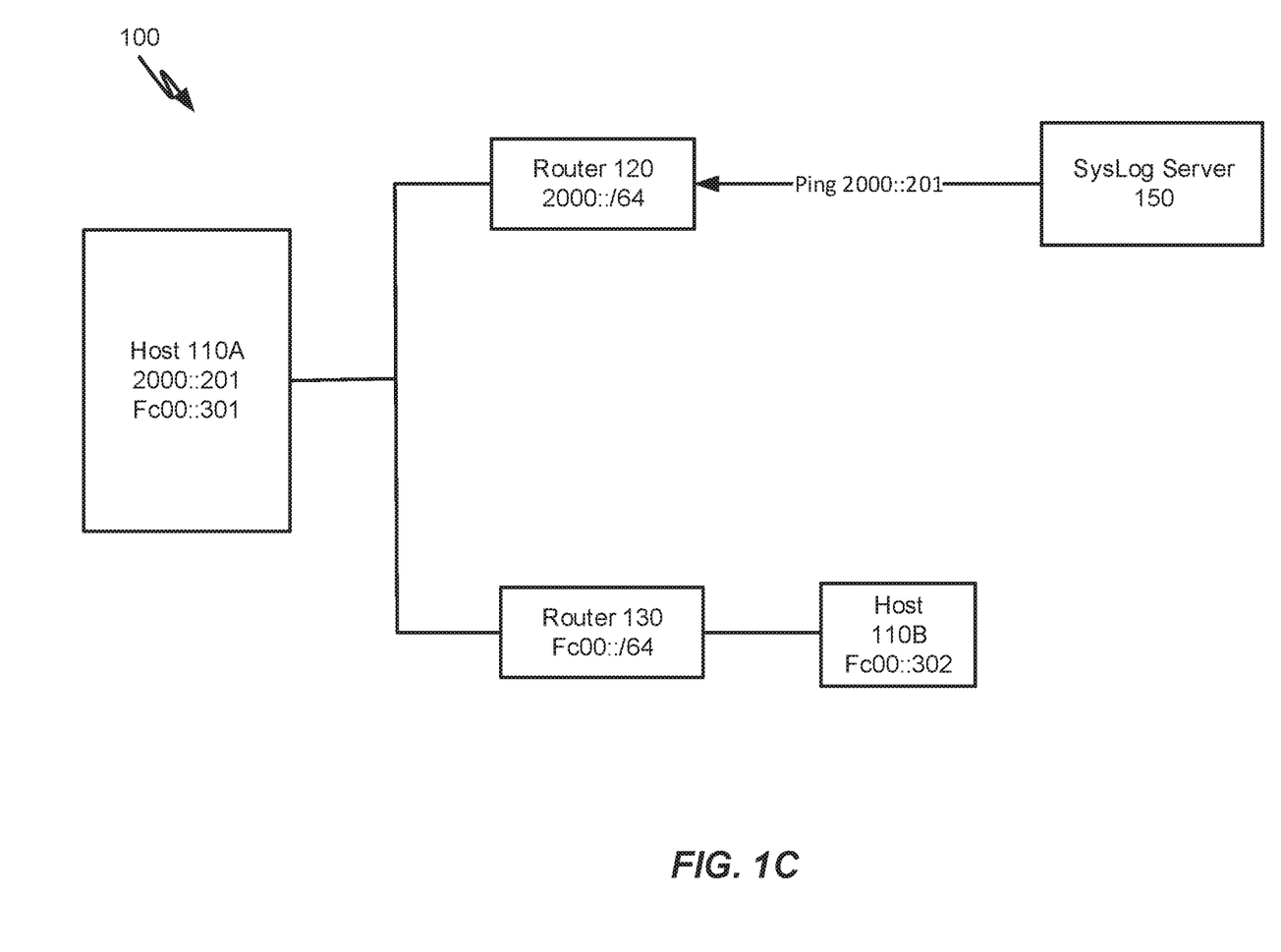
FIG. 1C is a block diagram depicting a communication system in accordance with embodiments of the present disclosure.

Consider the example where the host 110A selects address 2000::201 for the HOSTNAME in the system log message to system log server 150, illustrated in FIG. 1C. When the system log server 150 pings the host 110A using the address 2000::201 via the router 120, the host 110A is reachable. System log reports can be sent over the router 120 (ISP 1) using the IP address 2000::201, and the system log server 150 can reach the host 110A back via the router 120.

Figure 1D:
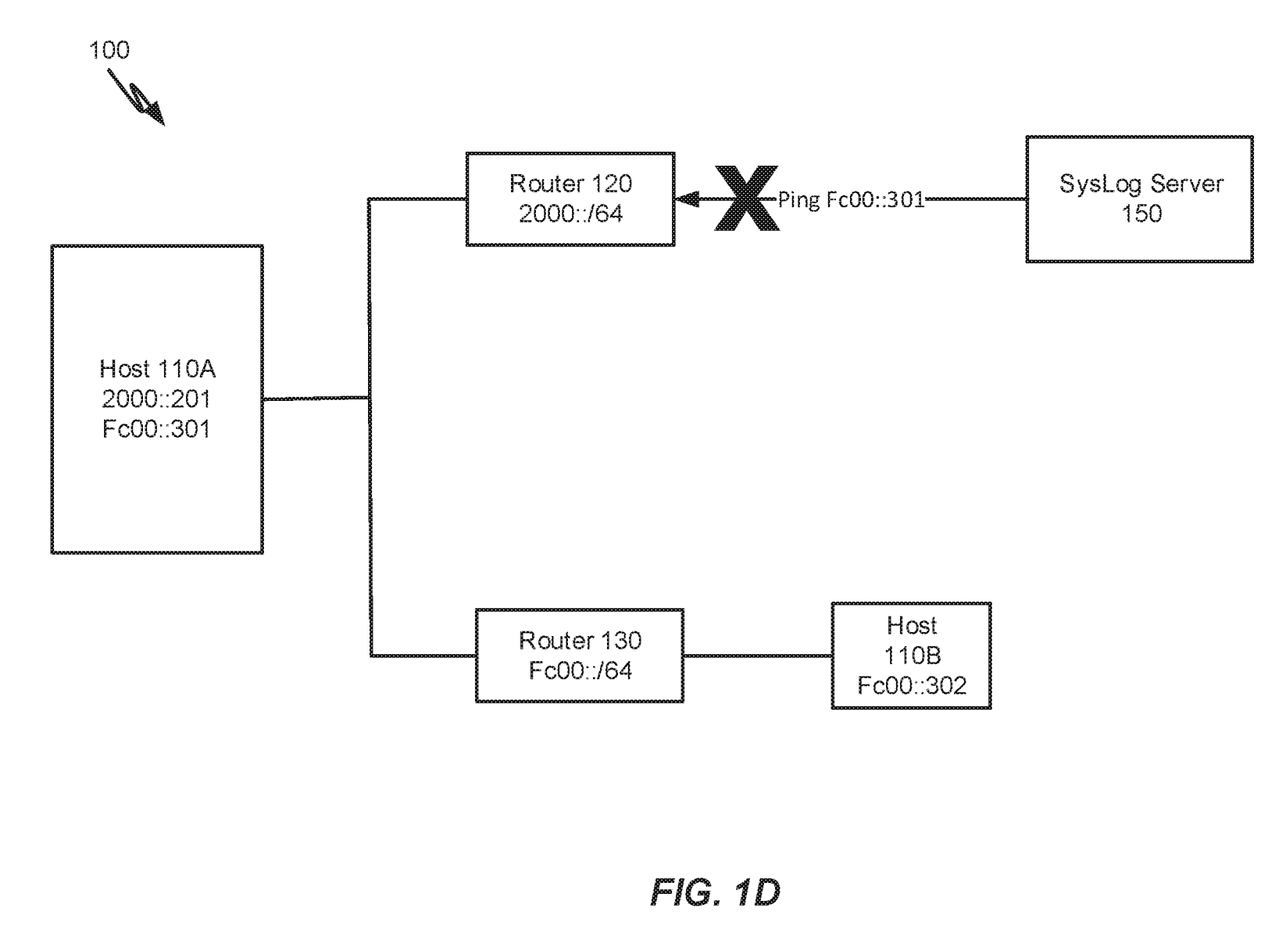
FIG. 1D is a block diagram depicting a communication system in accordance with embodiments of the present disclosure.

However, consider the alternative example, where the host 110A selects address Fc00::301 as the HOSTNAME in the system log message to the system log server 150, illustrated in FIG. 1D. Alternatively, since Fc00::301 is a local address is may not be accessible from router 120. From the perspective of the system log server 150, the host 110A is unreachable using the address Fc00::301. That is to say, system log server 150 cannot reach a local address globally. Furthermore, system log server 150 is not connected to ISP 2/router 130. If the host address is not reachable from the system log server location, an administrator would not be able to troubleshoot or rollback the host 110A after receiving an unreachable address for the HOSTNAME in the log message. Additionally, if the different prefixes are associated with different ISPs, the unreachable address may identify the wrong ISP used to transfer the system log message.

In accordance with at least some embodiments of the present disclosure, the enterprise network 100 may comprise any type of known communication medium or collection of communication media and may use any type of protocols to transport messages between endpoints. The enterprise network 100 may include wired and/or wireless communication technologies. In some examples, enterprise network 100 may comprise a public network such as the Internet or some other Internet Protocol (IP) network consisting of many computers, computing networks, and other communication devices located all over the world, which are connected through many telephone systems and other means. Other examples of communication networks include, without limitation, a standard Plain Old Telephone System (POTS), an Integrated Services Digital Network (ISDN), the Public Switched Telephone Network (PSTN), a LAN, a WAN, a Session Initiation Protocol (SIP) network, a Voice over IP (VoIP) network, a cellular network, an enterprise network, and any other type of packet-switched or circuit-switched network known in the art. In addition, it can be appreciated that enterprise network 100 need not be limited to any one network type, and instead may be comprised of a number of different networks and/or network types. Moreover, enterprise network 100 may comprise a number of different communication media such as coaxial cable, copper cable/wire, fiber-optic cable, antennas for transmitting/receiving wireless messages, and combinations thereof.

Although, only one network is shown for clarity, in some embodiments, the hosts 110A and 110B may be located on different networks. For example, the host 110B may be connected to a public network (e.g., the Internet), and the host 110A may be connected to a private network administered by a private enterprise with personalized security rules.

In some embodiments, the hosts 110A and 110B may include a personal communication device or a shared communication device (e.g., a conference phone). Examples of suitable hosts 110A and 110B include, without limitation, a telephone, a softphone, a cellular phone, a multi-speaker communication device (e.g., conference phone), a video phone, a PC, a laptop, a tablet, a PDA, a smartphone, a thin client, or the like. Hosts 110A and 110B may be pure consumers of audio/video (e.g., having a speaker only and/or having a screen only), pure producers of audio/video (e.g., having a microphone and/or camera only), or consumers and producers of audio/video. It should be appreciated that hosts 110A and 110B may be configured to support single or multi-user interactions with other network-connected devices within an enterprise communication network and/or across multiple communication networks.

Figure 2:
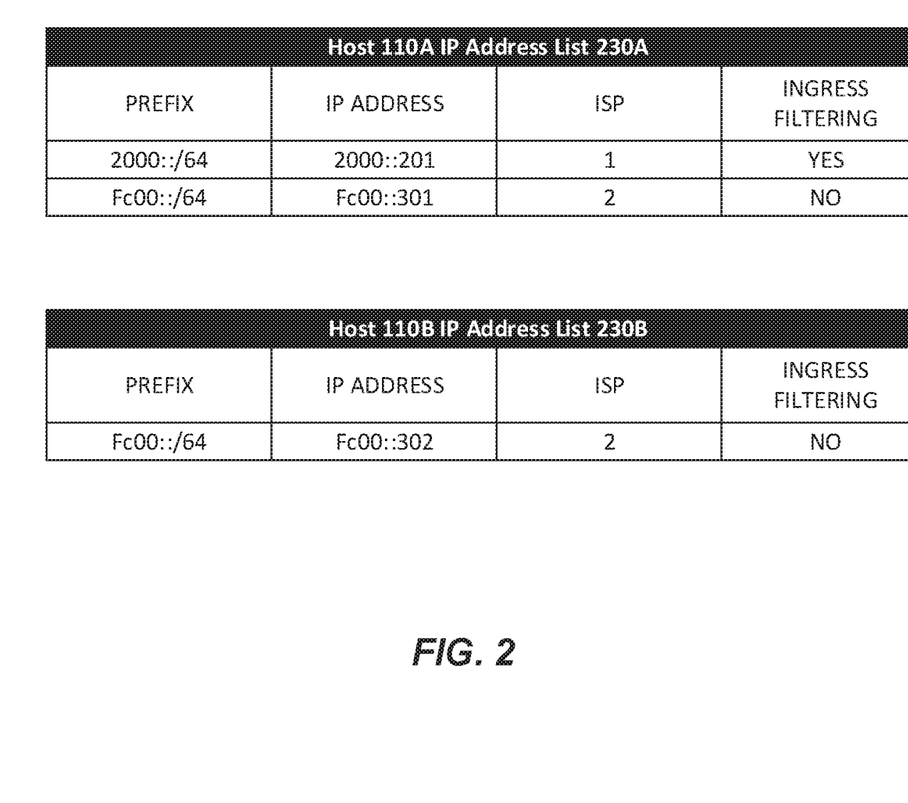
FIG. 2 illustrates examples of candidate lists in accordance with embodiments of the present disclosure.

FIG. 2 illustrates IP address lists 230A and 230B for the hosts 110A and 110B, respectively, although other data formats are possible and in accordance with the embodiments described herein.

IP address lists 230A and 230B comprise the fields/columns "Prefix," "IP Address," "ISP," and "Ingress Filtering." The columns listed are for illustrative purposes only, and not all columns are required, additionally, the address lists may include other columns not listed in this example. The IP address lists 230A and 230B may include static and/or dynamic IP addresses The "Prefix" field may list a prefix for the subnet accessible by the router. The "IP address" field may list the IP address reachable by the router. The "ISP" field may list the ISP associated with the Prefix/IP address. The "Ingress Filtering" field may indicate whether ingress filtering is activated and may also indicate the subnets that are blocked.

The address list 230A for the host 110A lists two IP addresses for the host 110A, 2000::201 and Fc00::301. The address list 230B for host 110B lists one IP address for the host 110B, Fc00::302.

The IP address lists 230A and 230B may be generated by broadcasting or multicasting router solicitation (RS) messages, and, in response, receiving router advertisement (RA) messages. For example, the host 110A multicasts RS messages, and receives Router Advertisements from the routers 120 and 130. Dynamic IP addresses may be populated using router messages, as described. A user may also statically assign the IP addresses.

Advantageously, the HOSTNAME will not only identify the host that sends the system log message, but also the right ISP over which the log messages are sent; and the selected HOSTNAME will always be reachable from the system log server location. Embodiments of the present disclosure ensure that multihomed hosts are reachable from the system log server using the HOSTNAME indicated in the log messages.

Figure 3A:
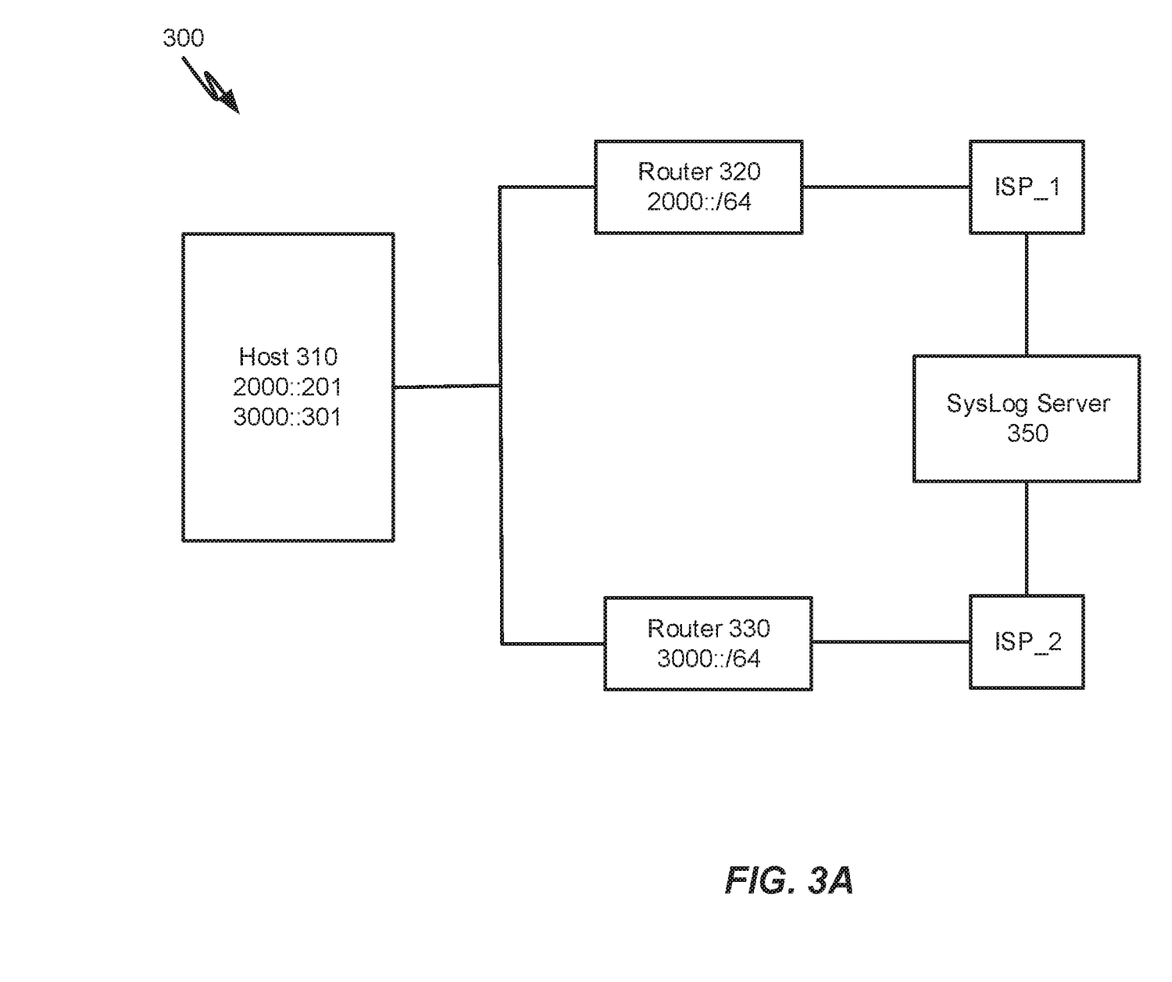
FIG. 3A illustrates a block diagram depicting a communication system in accordance with embodiments of the present disclosure.

FIG. 3A illustrates a communication network 300 comprising host 310, routers 320 and 330, and system log server 350. The host 310 is a multihomed device and may use IP address 2000::201 (via router the 320/ISP_1) or IP address 3000::301 (via router 330/ISP_2). In some embodiments, each of the router 320 and 330 are associated with a different ISP (e.g., ISP_1 and ISP_2).

Figure 3B:
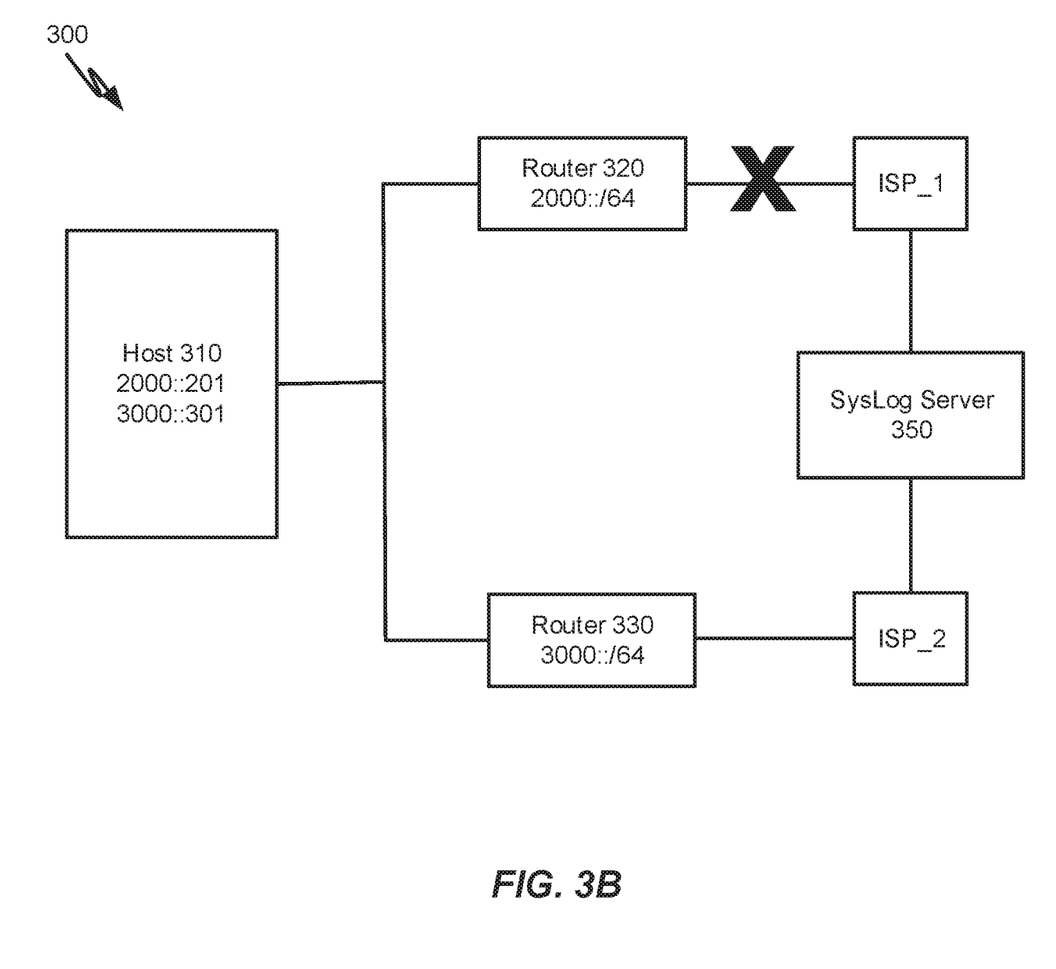
FIG. 3B illustrates a block diagram depicting a communication system in accordance with embodiments of the present disclosure.

FIG. 3B illustrates a failure in ISP_1, which causes a link failure between the router 320 and the system log server 350. The host 310 may transfer a system log message to the system log server 350 via the router 320, using address 2000::201, there is an uplink failure and the system log message is not delivered to the system log server 350. In another example, the host 310 may transfer a system log message to the system log server 350 over ISP_2 via the router 330, using address 2000::201, system log server 350 receives the log message, but since there is a failure of ISP_1, the system log server 350 will not be able to reach the host 310 using the address 2000::201. Therefore, if the host 310 detects an uplink failure to router 320, the host 310 should select an alternative address for the system log message(s). For example, the host 310 can select address 3000::301 as the HOSTNAME and send the system log message via router 330/ISP_2.

In some embodiments, after an uplink failure, the router 320 may send a Redirect message to the host 310, directing the host to use the router 330. The prefix 2000::/64 for the router 320 may also expire. The information received in the Router Advertisements and the Redirect messages may be used by a host to generate the address lists 230A and 230B.

Although a host device is discussed, it should be appreciated that this method of generating an address list may be used by any device that selects addresses, such as, but not limited to, hosts, endpoints, remote devices, gateways, etc.

In some examples, the system log server 350 may have a candidate list for the host 310, in the event of a link failure, the system log server 350 may check the connectivity of addresses in the candidate list for the host 310. The candidate list for the host 310 may be ordered based on host policies. The system log server 350 checks connectivity with the first address, if the address is not reachable, the system log server 350 selects the next address from the candidate list for the host 310. In accordance with at least some embodiments of the present disclosure, the communication network 300 may comprise any type of known communication medium or collection of communication media and may use any type of protocols to transport messages between endpoints. The communication network 300 may include wired and/or wireless communication technologies. In some examples, communication network 300 may comprise a public network such as the Internet or some other Internet Protocol (IP) network consisting of many computers, computing networks, and other communication devices located all over the world, which are connected through many telephone systems and other means. Other examples of communication networks include, without limitation, a standard Plain Old Telephone System (POTS), an Integrated Services Digital Network (ISDN), the Public Switched Telephone Network (PSTN), a LAN, a WAN, a Session Initiation Protocol (SIP) network, a Voice over IP (VoIP) network, a cellular network, an enterprise network, and any other type of packet-switched or circuit-switched network known in the art. In addition, it can be appreciated that communication network 300 need not be limited to any one network type, and instead may be comprised of a number of different networks and/or network types. Moreover, communication network 300 may comprise a number of different communication media such as coaxial cable, copper cable/wire, fiber-optic cable, antennas for transmitting/receiving wireless messages, and combinations thereof.

In some embodiments, the host 310 may include a personal communication device or a shared communication device (e.g., a conference phone). Examples of suitable host 310 include, without limitation, a telephone, a softphone, a cellular phone, a multi-speaker communication device (e.g., conference phone), a video phone, a PC, a laptop, a tablet, a PDA, a smartphone, a thin client, or the like. Host 310 may be configured to support single or multi-user interactions with other network-connected devices within a communication network and/or across multiple communication networks.

Figure 4:
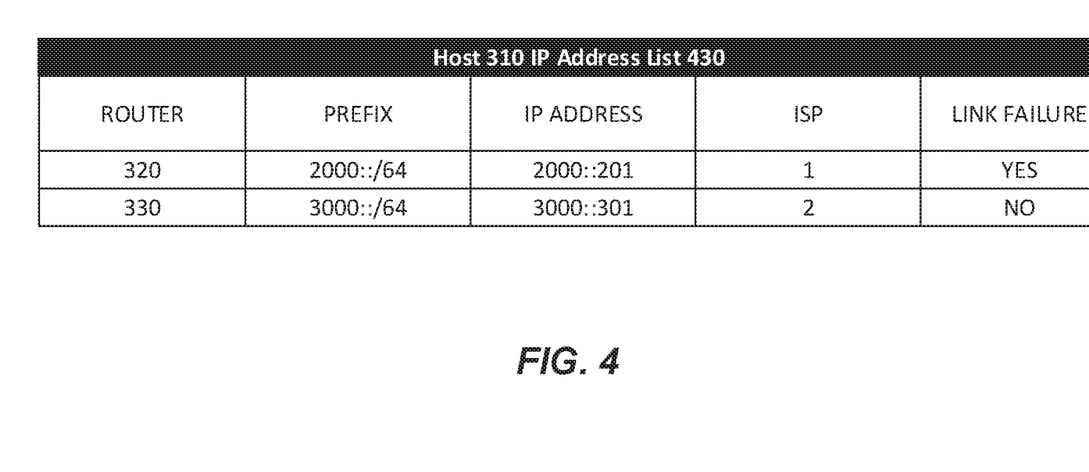
FIG. 4 illustrates an example of a candidate list in accordance with embodiments of the present disclosure.

FIG. 4 illustrates IP address list 430 for the host 310, although other data formats are possible and in accordance with the embodiments described herein.

Address List 430 comprise the fields/columns "Router," "Prefix," "IP Address," "ISP," and "Link Failure." The columns listed are for illustrative purposes only, and not all columns are required, additionally, the address lists may include other columns not listed in this example.

The "Router" field may list information for/name of the associated router. The "Prefix" field may list a prefix for the subnet accessible by the router. The "IP address" field may list the IP address reachable by the router. The "ISP" field may list the ISP associated with the Prefix/IP address. The "Link Failure" field may indicate whether there is a link failure on the link.

The address list 430 for the host 310 lists two IP addresses for the host 310, 2000::201 and 3000::301.

The IP address list 430 may be generated by broadcasting or multicasting router solicitation (RS) messages, and, in response, receiving router advertisement (RA) messages. For example, the host 310 multicasts RS messages, and receives Router Advertisements from the routers 320 and 330.

Figure 5:
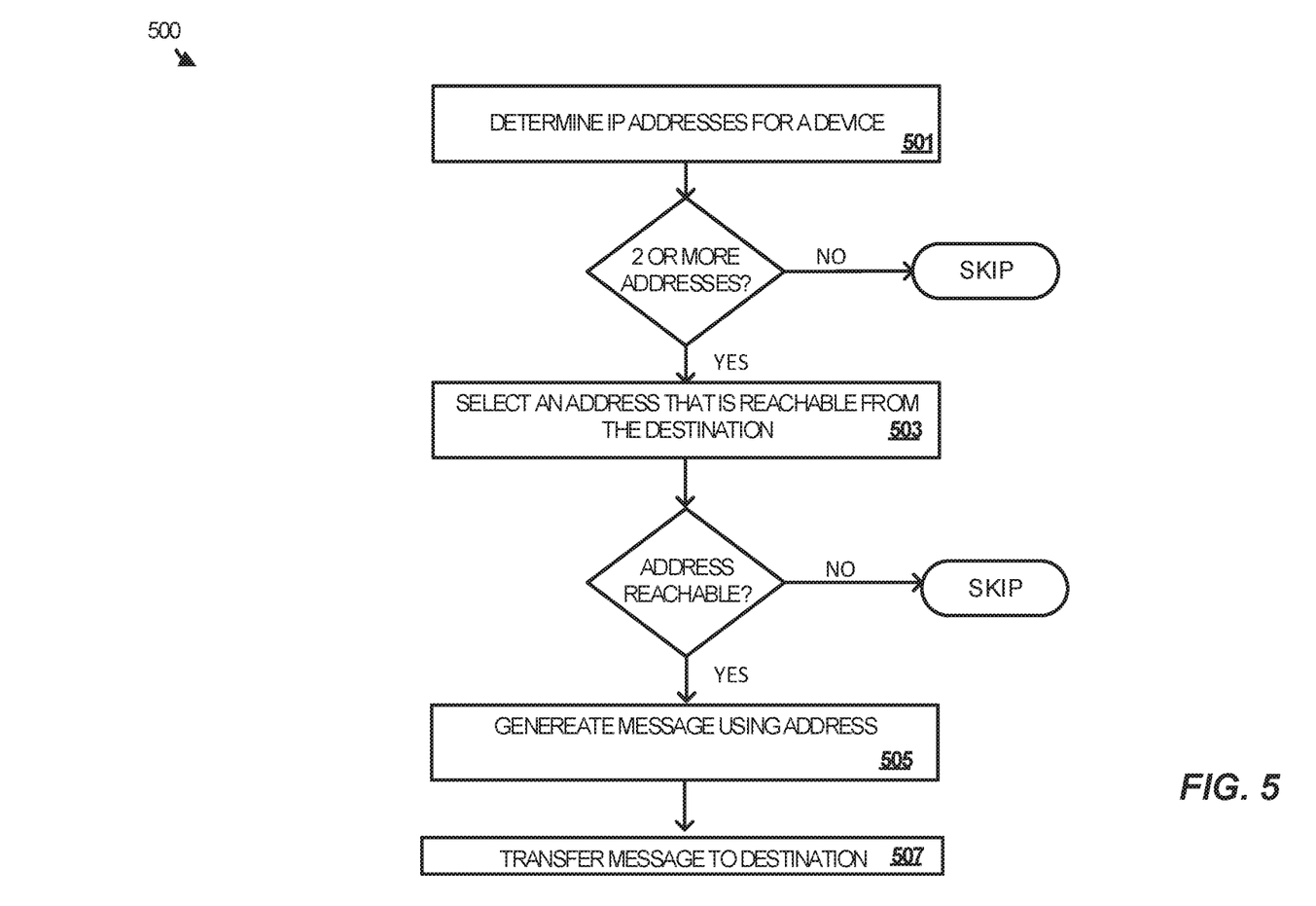
FIG. 5 is a flow diagram depicting address selection for system log messages in accordance with embodiments of the present disclosure.

FIG. 5 illustrates a method 500 for selecting a HOST-NAME in accordance with at least some embodiments of the present disclosure. The method 500 are referenced parenthetically in the paragraphs that follow, along with references to the elements and systems from the enterprise network 100 of FIGS. 1A-D and the communication network 300 of FIGS. 3A-B. The method 500 can be executed as a set of computer-executable instructions encoded or stored on a computer readable medium and executed by the processing system 603 in FIG. 6.

While a general order for the steps of the method 500 is shown in FIG. 5, the method 500 can include more or fewer steps or can arrange the order of the steps differently than those shown in FIG. 5.

The method 500 start with determining IP addresses for a host (step 501). For example, a host may broadcast (or multicast) a solicitation message, and in response, the host receives one or more advertisement messages (e.g., router advertisement messages) from one or more routers. The host dynamically creates IP addresses based on the router prefixes (e.g., when SLACC, Stateless Address Autoconfiguration, is enabled), and/or the IP addresses can be statistically assigned. The host adds the router information from the advertisement message to its routing table. If the host only has one IP address, the rest of the method 500 is skipped.

If the host has two or more IP addresses (e.g., a multihomed host). The host selects an IP address that is reachable from a destination for a message (step 503). In some example, the host may select the IP address using a source address selection. It is desirable for the host to select an egress router over which the destination (e.g., system log server) is reachable, then select an address that starts with the same prefix as the selected router. If the selected IP address is reachable from the destination, the host uses the selected IP address to generate the message (step 505). The host transfers the generated message to the destination (step 507). In some examples, the destination may be reachable using more than one router/path, in these situations some optimization criteria may be used to select the optimal route, and select/dynamically create the source address based on the optimal route.

Figure 6:
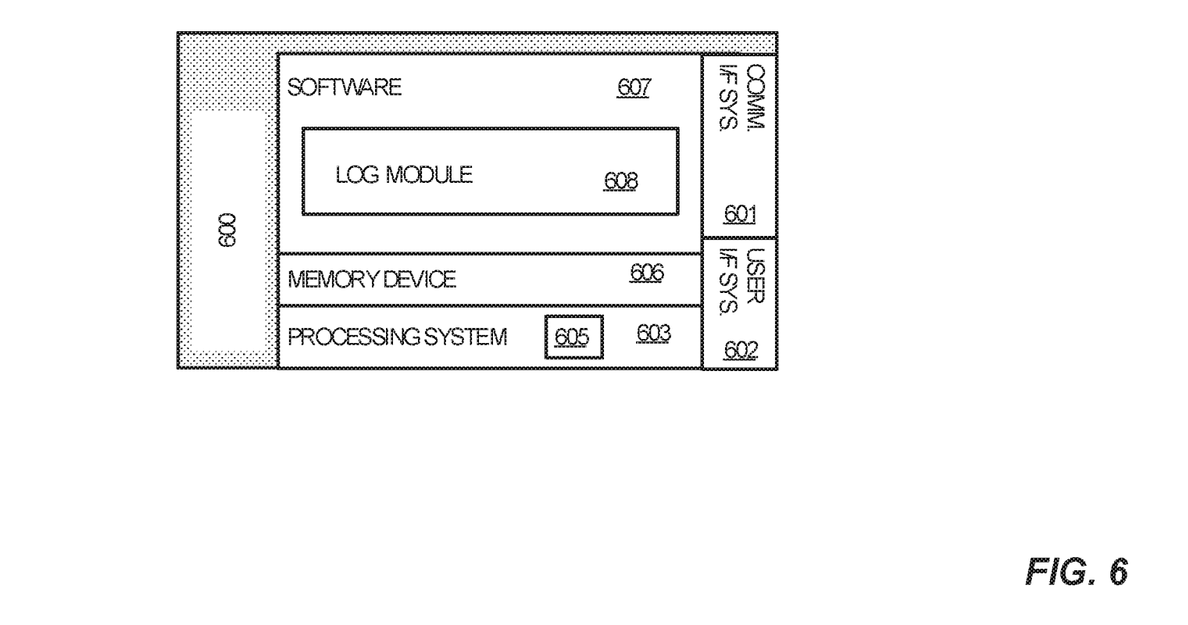
FIG. 6 is a block diagram of a computer used to implement the method to select an address for system log messages in accordance with embodiments of the present disclosure.

FIG. 6 illustrates computing system 600 used select a HOSTNAME reachable from a system log server for log message as described herein, according to one implementation. Similar computing systems may be included in Hosts 110A-B and 310 described herein used to select a HOSTNAME reachable from the destination/system log server 150/350.

Computing system 600 is representative of any computing system or systems with which the various operational architectures, processes, scenarios, and sequences disclosed herein for providing a communication service and selecting media paths may be implemented.

Computing system 600 is an example of hosts 110A and 110B, although other examples may exist. Computing system 600 comprises communication interface 601, user interface 602, and processing system 603. Processing system 603 is linked to communication interface 601 and user interface 602. Processing system 603 includes a microprocessor and/or processing circuitry 605 and memory device 606 that stores operating software 607. Computing system 600 may include other well-known components such as a battery and enclosure that are not shown for clarity. Computing system 600 may comprise a server, a user device, a desktop computer, a laptop computer, a tablet computing device, or some other user communication apparatus.

Communication interface 601 comprises components that communicate over communication links, such as network cards, ports, radio frequency (RF), processing circuitry and software, or some other communication devices. Communication interface 601 may be configured to communicate over metallic, wireless, or optical links. Communication interface 601 may be configured to use Time Division Multiplex (TDM), Internet Protocol (IP), Ethernet, optical networking, wireless protocols, communication signaling, or some other communication format—including combinations thereof. In some implementations, communication interface 601 is configured to communicate with other end user devices, wherein the communication interface is used to transfer and receive voice communications for the devices.

User interface 602 comprises components that interact with a user to receive user inputs and to present media and/or information. User interface 602 may include a speaker, microphone, buttons, lights, display screen, touch screen, touch pad, scroll wheel, communication port, or some other user input/output apparatus—including combinations thereof. User interface 602 may be omitted in some examples.

Processing circuitry 605 comprises a microprocessor and other circuitry that retrieves and executes operating software 607 from memory device 606. Memory device 606 may include volatile and nonvolatile, removable and non-removable media implemented in any method or technology for storage of information, such as computer readable instructions, data structures, program modules, or other data. Memory device 606 may be implemented as a single storage device, but may also be implemented across multiple storage devices or sub-systems. Memory device 606 may comprise additional elements, such as a controller to read operating software 607. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing circuitry 605 is typically mounted on a circuit board that may also hold memory device 606 and portions of communication interface 601 and user interface 602. Operating software 607 comprises computer programs, firmware, or some other form of machine-readable program instructions. Operating software 607 includes log module 608, although any number of software modules within the application may provide the same operation. Operating software 607 may further include an operating system, utilities, drivers, network interfaces, applications, or some other type of software. When executed by processing circuitry 605, operating software 607 directs processing system 603 to operate computing system 600 as described herein.

In at least one implementation, log module 608, when read and executed by processing system 603, directs processing system 603 to select a HOSTNAME that is reachable from the destination. For example, multihomed device may be connected to one or more routers. Therefore, some of the addresses for a multihomed device may be unreachable from some destinations. If the multihomed device uses a HOSTNAME in a log message that is unreachable from the system log server, the system log server will not be able to troubleshoot or roll back the device in the event of an error or failure.

It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method for a multihomed host to select a hostname for a message, the method comprising:
    determining two or more Internet Protocol (IP) addresses for the multihomed host, wherein ingress filtering is activated on at least one IP address of the two or more IP addresses for the multihomed host;
    determining, by the multihomed host, reachability from a destination for each IP address of the two or more IP addresses for the multihomed host, wherein at least one of the two or more IP addresses is unreachable from the destination;
    ordering, by the multihomed host, the two or more IP addresses into an ordered list based on the determined reachability of each address from the destination;
    generating the message using a first IP address in the ordered list for the hostname of the multihomed host; and
    transferring the message to the destination.

2. The method of claim 1, further comprising:
    detecting an uplink failure on a path the message is transferred over; and
    rerouting the message with an updated IP address for the hostname of the multihomed host.

3. The method of claim 1, wherein the destination comprises a system log server.

4. The method of claim 1, wherein determining reachability from the destination for each IP address comprises performing source address selection.

5. The method of claim 1, wherein the message comprises a system log message.

6. The method of claim 1, wherein at least one of the two or more IP addresses comprises an IPv6 address, and wherein the destination is on an IPv4 network.

7. The method of claim 1, wherein each IP address of the two or more IP addresses is associated with a different Internet Service Provider.

8. A multihomed device to select a hostname for a message, the multihomed device comprising:
    a transceiver configured to multicast a solicitation message, and in response, to receive two or more address prefixes in an advertisement message wherein ingress filtering is activated on at least one IP address prefix of the received two or more IP address prefixes for the multihomed device;
    a processor configured to dynamically assign two or more IP addresses using the two or more IP address prefixes;
    the processor configured to determine reachability from a destination for each IP address of the two or more IP addresses, wherein at least one of the two or more IP addresses is unreachable from the destination;
    the processor configured to order the two or more IP addresses into an ordered list based on the determined reachability of each address from the destination;
    the processor configured to generate the message using a first IP address in the ordered list as the hostname of the multihomed device;
    the transceiver configured to transfer the message to the destination.

9. The multihomed device of claim 8, further comprising:
    the processor detecting an uplink failure on a path the message is transferred over; and
    the transceiver rerouting the message with an updated IP address for the hostname for the multihomed device.

10. The multihomed device of claim 8, wherein the destination comprises a system log server.

11. The multihomed device of claim 8, wherein the processor is further configured to perform source address selection.

12. The multihomed device of claim 8, wherein the message comprises a system log message.

13. The multihomed device of claim 8, wherein at least one of the two or more IP addresses comprises an IPv6 address, and wherein the destination is on an IPv4 network.

14. The multihomed device of claim 8, wherein each address prefix of the two or more address prefixes is associated with a different Internet Service Provider.

15. A non-transitory computer-readable medium storing one or more programs, the one or more programs comprising instructions, which when executed by an electronic device cause the electronic device to implement a method for a multihomed device to select a hostname for a message, comprising:

determining two or more Internet Protocol (IP) addresses for the multihomed device;

wherein ingress filtering is activated on at least one IP address of the two or more IP addresses for the multihomed device;

determining reachability from a destination for each IP address of the two or more IP addresses, wherein at least one of the two or more IP addresses is unreachable from the destination;

ordering the two or more IP addresses into an ordered list based on the determined reachability of each address from the destination;

generating the message using a first IP address in the ordered list for the hostname of the multihomed device; and transferring the message to the destination.

16. The non-transitory computer-readable medium of claim 15, wherein the destination comprises a system log server.

17. The non-transitory computer-readable medium of claim 15, wherein the instructions further instruct the processor to perform source address selection.

18. The non-transitory computer-readable medium of claim 15, wherein the message comprises an error message.

19. The non-transitory computer-readable medium of claim 15, wherein each IP address of the two or more IP addresses is associated with a different Internet Service Provider.

* * * * *

UNITED STATES PATENT AND TRADEMARK OFFICE
CERTIFICATE OF CORRECTION

PATENT NO. : 11,265,248 B2
APPLICATION NO. : 16/656366
DATED : March 1, 2022
INVENTOR(S) : Dusan Mudric It is certified that error appears in the above-identified patent and that said Letters Patent is hereby corrected as shown below:

In the Claims

At Column 14, Line 16, of Claim 17, delete "the" and insert --a-- therein. (second occurrence)

Signed and Sealed this
Twenty-eighth Day of June, 2022

Katherine Kelly Vidal
*Director of the United States Patent and Trademark Office*